(12) United States Patent
Lowental

(10) Patent No.: US 11,679,892 B2
(45) Date of Patent: Jun. 20, 2023

(54) UNMANNED AERIAL VEHICLE PARALLEL HYBRID DRIVE ASSEMBLY WITH CONTINUOUS BELT TENSION MODULATION

(71) Applicant: Lowental Hybrid, Meishar (IL)

(72) Inventor: Itay Lowental, Meishar (IL)

(73) Assignee: Lowental Hybrid, Meishar (IL)

( * ) Notice: Subject to any disclaimer, the term of this patent is extended or adjusted under 35 U.S.C. 154(b) by 5 days.

(21) Appl. No.: 17/571,574

(22) Filed: Jan. 10, 2022

(65) Prior Publication Data

US 2022/0348342 A1 Nov. 3, 2022

Related U.S. Application Data

(60) Provisional application No. 63/134,996, filed on Jan. 8, 2021.

(51) Int. Cl.

| | |
|---|---|
| *B64D 35/08* | (2006.01) |
| *B60L 53/24* | (2019.01) |
| *B64C 39/02* | (2023.01) |
| *B64D 27/24* | (2006.01) |
| *B64D 35/02* | (2006.01) |
| *H02K 7/10* | (2006.01) |
| *H02K 7/116* | (2006.01) |
| *H02K 11/00* | (2016.01) |
| *B64D 27/02* | (2006.01) |

(Continued)

(52) U.S. Cl.
CPC ............. *B64D 35/08* (2013.01); *B60L 53/24* (2019.02); *B64C 39/024* (2013.01); *B64D 27/24* (2013.01); *B64D 35/02* (2013.01); *H02K 7/1004* (2013.01); *H02K 7/116* (2013.01); *H02K 11/0094* (2013.01); *B64D 2027/026* (2013.01); *B64U 50/11* (2023.01); *B64U 50/19* (2023.01)

(58) Field of Classification Search
CPC ........ B64D 35/08; B64D 27/24; B64D 35/02; B64D 2027/026; B60L 53/24; H02K 7/1004; H02K 7/116; H02K 11/0094; B64U 50/11; B64U 50/19
See application file for complete search history.

(56) References Cited

U.S. PATENT DOCUMENTS

| | | | |
|---|---|---|---|
| 6,453,583 B1 * | 9/2002 | Hanafusa | E01H 5/04 37/246 |
| 9,254,922 B2 * | 2/2016 | Anderson | B64D 27/24 |
| 9,321,516 B1 * | 4/2016 | Lafreniere | B63H 21/20 |

(Continued)

FOREIGN PATENT DOCUMENTS

| | | | | |
|---|---|---|---|---|
| WO | WO-2021125968 A1 * | 6/2021 | | B60K 6/365 |

*Primary Examiner* — Pedro J Cuevas
(74) *Attorney, Agent, or Firm* — The IP Law Firm of Guy Levi, LLC

(57) ABSTRACT

The disclosure is directed to parallel hybrid drive assemblies for lightweight unmanned aerial vehicles (UAVs). Specifically, the disclosure is directed to hybrid drive assemblies and control systems for UAVs, utilizing continuous belt tension modulation to couple and decouple an electric motor and an internal combustion engine. In some embodiments, this is achieved through the use of a tensioner module that is configured to couple and decouple the electric motor and the internal combustion engine by continuously and selectably modulating belt tension on drive elements of each of the electric motor and the internal combustion engine.

20 Claims, 5 Drawing Sheets

(51) Int. Cl.
  *B64U 50/11*  (2023.01)
  *B64U 50/19*  (2023.01)

(56) References Cited

U.S. PATENT DOCUMENTS

| | | | |
|---|---|---|---|
| 9,879,768 B2* | 1/2018 | Kolokythas | F16H 37/065 |
| 11,401,042 B2* | 8/2022 | Peleg | B60L 50/60 |
| 11,447,235 B2* | 9/2022 | Kunii | B64U 10/13 |
| 11,530,033 B2* | 12/2022 | Preisser | B64C 27/14 |
| 11,572,191 B1* | 2/2023 | Allias | B64D 35/02 |
| 2013/0231208 A1* | 9/2013 | Buono | B64D 27/24 |
| | | | 475/5 |
| 2014/0060995 A1* | 3/2014 | Anderson | F01B 21/00 |
| | | | 903/902 |
| 2016/0167799 A1* | 6/2016 | Smaoui | F02B 37/00 |
| | | | 701/16 |
| 2017/0066539 A1* | 3/2017 | van der Westhuizen | |
| | | | B64C 11/00 |
| 2017/0089438 A1* | 3/2017 | Kolokythas | B64C 27/12 |
| 2017/0253331 A1* | 9/2017 | Nakashima | B64C 39/024 |
| 2019/0061924 A1* | 2/2019 | Kita | B64D 35/04 |
| 2020/0262574 A1* | 8/2020 | Peleg | B64C 39/024 |
| 2020/0407052 A1* | 12/2020 | Preisser | B64C 39/024 |
| 2023/0010644 A1* | 1/2023 | Heggen | B64U 50/19 |
| 2023/0017954 A1* | 1/2023 | Allias | B64D 35/08 |

\* cited by examiner

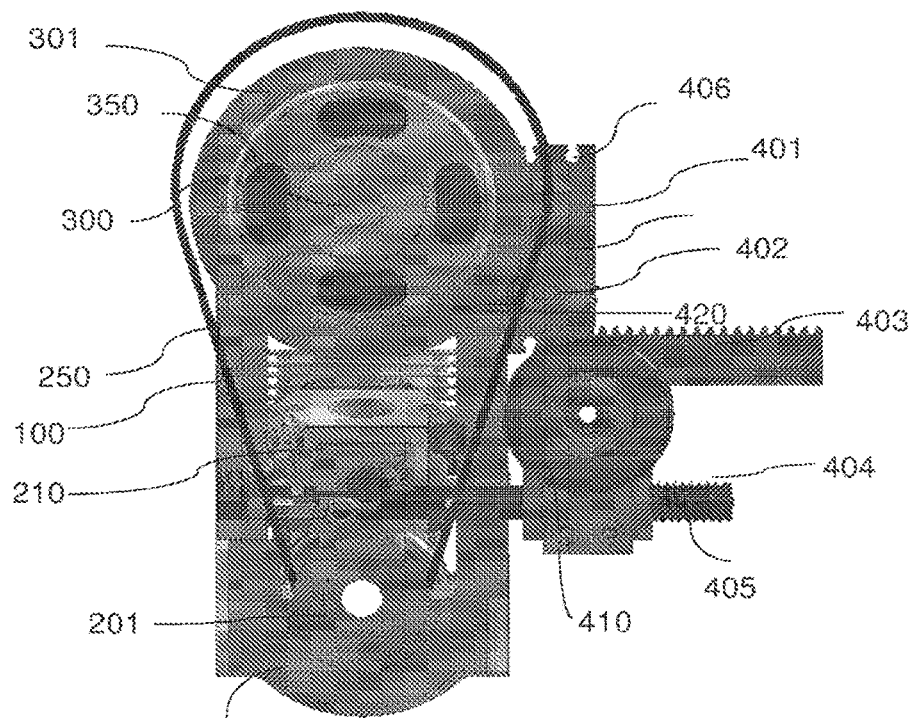
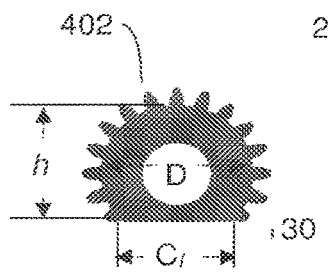
FIG. 3C
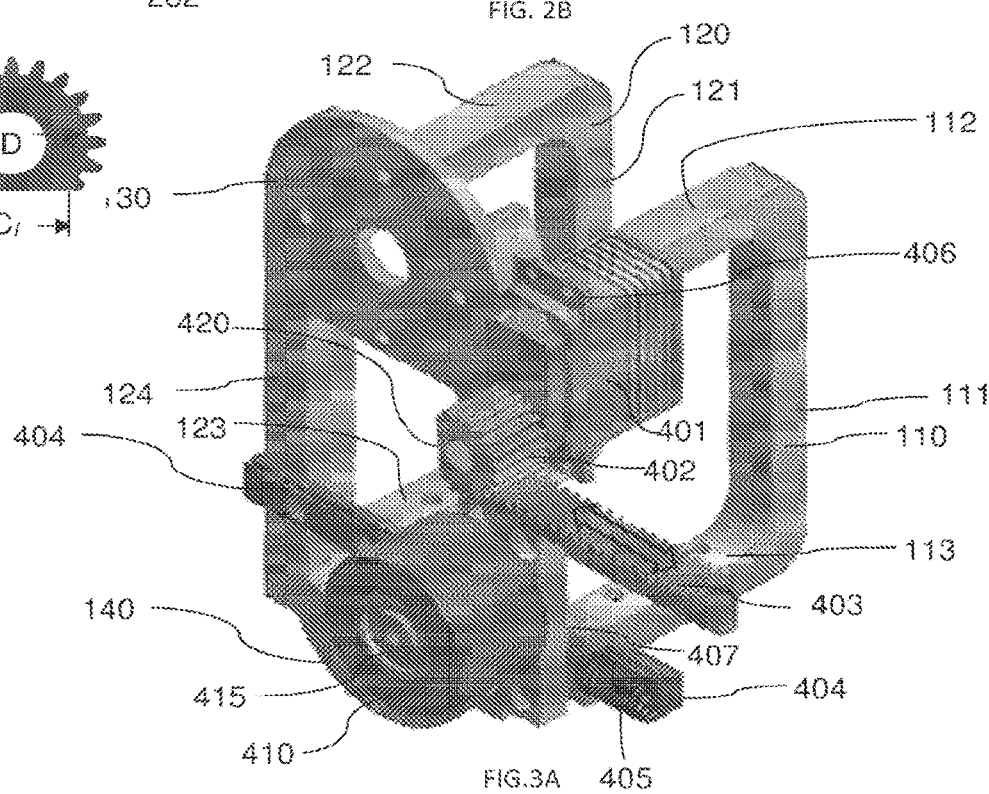

UNMANNED AERIAL VEHICLE PARALLEL HYBRID DRIVE ASSEMBLY WITH CONTINUOUS BELT TENSION MODULATION

CROSS-REFERENCE TO RELATED APPLICATIONS

This application claims the benefit of U.S. Provisional Patent Application No. 63/134,996, filed Jan. 8, 2021, which is incorporated by reference herein in its entirety.

FIELD

The present application relates to unmanned aerial vehicle propulsion systems; and aircraft capable of landing or taking-off vertically.

BACKGROUND

The present disclosure relates to drive assemblies for unmanned aerial vehicles ("UAVs"). Specifically, the instant disclosure relates to hybrid drive assemblies and control systems for UAVs utilizing continuous belt tension modulation.

Unmanned aerial vehicles are remotely piloted or self-piloted aircraft that can carry cameras, sensors, communications equipment, or other payloads. A UAV is capable of controlled, sustained, level flight and is often powered by either a gas turbine or a reciprocating internal combustion engine. UAVs may be remotely controlled or may fly autonomously based on pre-programmed flight plans or more complex dynamic automation systems.

UAVs have become used increasingly for various applications where the use of manned flight vehicles is not appropriate or is not feasible. Such applications may include military situations, such as surveillance, reconnaissance, target acquisition, data acquisition, communications relay, decoy, harassment, or supply flights. These vehicles are also used in a growing number of civilian applications, such as firefighting when a human observer would be at risk, police observation of civil disturbances or crime scenes, reconnaissance support in natural disasters, and scientific research, such as collecting data from within a hurricane.

Furthermore, advances in technology have led to an explosion in the use of small unmanned aircraft systems ("UAS"). Small UAS have proven to be particularly effective for performing persistent intelligence, surveillance and reconnaissance (ISR) missions for the military and private sectors. Many military combatant commanders have developed an insatiable appetite for this asymmetric advantage over the enemy. Civilian law enforcement agencies and the Department of Homeland Security have also rapidly adopted the aircraft for their unprecedented capabilities. For example, UAS may be used to provide aerial photography, surveying land and crops, monitoring forest fires and environmental conditions, and protecting borders and ports against intruders.

Despite the exponential increase in UAS employment, and due to ever increasing operational requirements; most currently available UAS are lacking in their endurance and/or the stealth attributes. Ignoring inferior acoustic and thermal signatures, internal combustion engine driven aircrafts may not possess adequate endurance for prolonged ISR (and other) missions.

Electric propulsion systems can be nearly silent and have a diminished thermal signatures compared with the thermal signature associated with internal combustion engines. However, electric drive systems suffer from dismal endurance times due to relatively low specific energies and rapid rates of depletion of current battery technology. While each system possesses desired mission attributes, alone, neither is completely sufficient to meet mission critical attributes.

These and other issues are addressed by the disclosed technology.

SUMMARY

Disclosed, in various embodiments, are drive assemblies for lightweight unmanned aerial vehicles (UAVs). Specifically, disclosed are hybrid drive assemblies and control systems utilizing continuous belt tension modulation.

In an embodiment provided herein is a drive assembly for an unmanned aerial vehicle (UAV), or unmanned aerial system (UAS) comprising: a housing frame; an internal combustion engine basally coupled to the housing frame; an electric motor, apically coupled to the housing frame; a propeller, rotatably coupled to the electric motor; a belt, operably coupled to the electric motor and the internal combustion engine; a tensioner module, coupled to the housing frame, configured to couple and decouple the electric motor and the internal combustion engine by continuously and selectably modulating the belt tension.

In another embodiment, the tension module comprises: a drive unit mounted in the housing; a pinion rotatably operably coupled to the drive unit; a toothed rack operably coupled to the pinion; a sled coupled to the rack, the sled defining a basal channel configured to slidably engage a guiding rail; a tension pulley, rotatably coupled to the sled; the guiding rail, coupled to the sled; and a biaser, operably coupled to the guide rail, and configured to bias the tension pulley toward the belt.

These and other features of the hybrid drive assemblies and control systems for lightweight UAVs and/or UAS, utilizing continuous belt tension modulation will become apparent from the following detailed description when read in conjunction with the drawings, which are exemplary, not limiting, and wherein like elements are numbered alike in several figures.

BRIEF DESCRIPTION OF THE FIGURES

For a better understanding of the drive assemblies for lightweight unmanned aerial vehicles (UAVs), with regard to the embodiments thereof, reference is made to the accompanying drawings, in which like numerals designate corresponding elements or sections throughout and in which.

DETAILED DESCRIPTION

Figure 1:
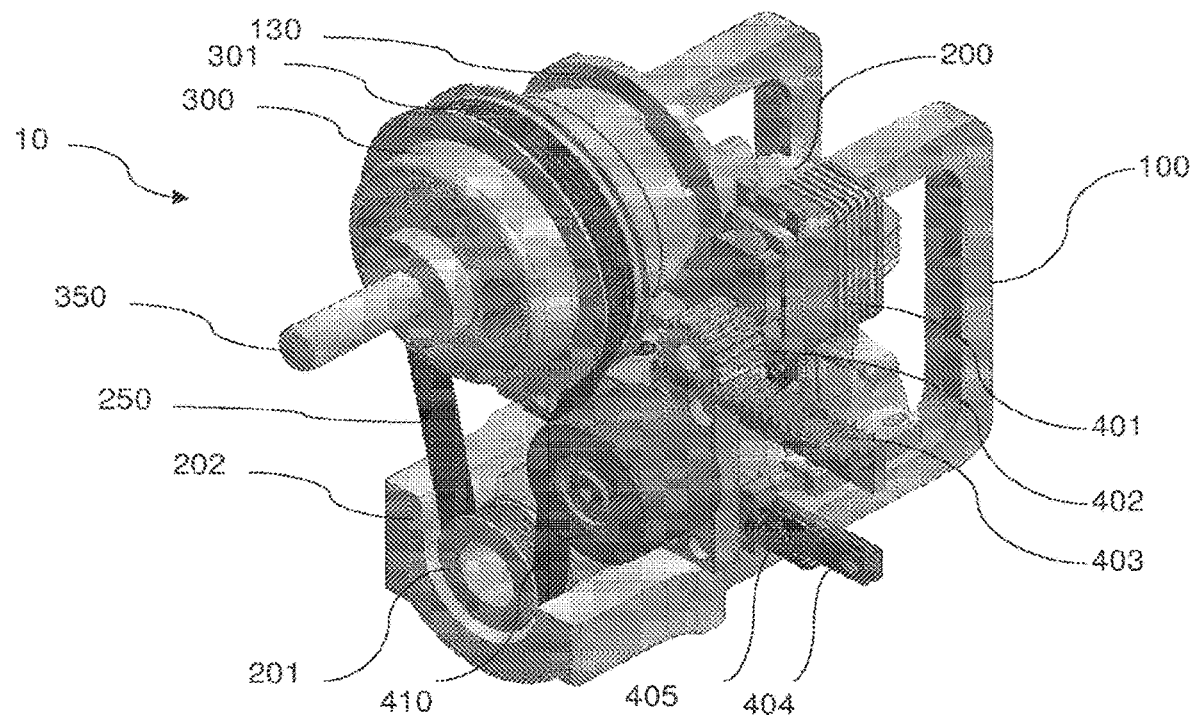
FIG. 1 illustrates a schematic showing a front top left perspective of an embodiment of the drive assemblies for lightweight unmanned aerial vehicles (UAVs)

Provided herein are embodiments of hybrid drive assemblies and control systems for lightweight UAVs or UASs, utilizing continuous belt tension modulation.

Provided herein are drive assemblies configured to deliver two separate and complementary moment-generating sources. The first is an electric motor (EM) powered by a rechargeable power source with fixed and limited energy, which weight is constant and is not consumed during flight. In addition, the electric motor produces a maximal power yield that is relatively high when compared to the motor weight and the rechargeable power source's (RPS) weight. Moreover, actuation of the electric motor is nearly instantaneous and does not require extended actuation times and stabilization. The second moment-generating source is an internal combustion engine (ICE), which has a relative low energy consumption due in part to the high energy density of its fuel. Furthermore, the ICE has a relatively low inherent weight compared with output, through the use, in certain embodiments, of a two-stroke engine configuration.

By using the disclosed drive assemblies and control systems to coordinate the optimal operation of the ICE (e.g., watts as a function of fuel consumption and RPM) with the optimal operation of the propeller (e.g., thrust (drag) as a function of RPM), it is possible to improve the energy consumption of a drone using a combination of the disclosed ICE and EM technologies relative to a typical weight-equivalent drone using only a gas turbine or a reciprocating internal combustion engine by about 4-fold.

For example, factors used to optimize the performance of the UAV can be at least one of the propeller RPM, (dynamic) thrust (or drag) produced by the propeller, DC current and voltage entering the EM, and ICE fuel consumption. Using these parameters, the ratio of thrust over electric output (watts) can be calculated. In addition, using statistical techniques, such as principal component analysis, readings (measurements, e.g., of the same parameters) taken at various altitudes and flight velocities can provide the optimal working parameters.

The electric motor provided is configured to have negligible reaction time during actuation and go from 0 to 100% output in a very short time, without any preliminary processes, which allows for launching of the UAS/UAV without the need to start the ICE when the UAV/UAS is coupled to the launcher. Accordingly, it is unnecessary for the propeller to rotate thus interfering with the launcher's geometry, nor does the UAV engine affect or be affected by the developing acceleration.

Conversely, once decoupled from the launcher, the electric motor can actuate at full output capacity, allowing for rapid ascent to 2000-3000 feet and more if required with relatively low sound and thermal signature where detection risk is likely at its highest.

In an embodiment, the electric motor used in the drive assemblies provided herein can be configured to at least one of:

a. provide the sole propulsion source to the UAS/UAV upon launch, to an altitude of about 5,000 feet;
b. actuate the ICE upon receiving the command to actuate the ICE;
c. be used as the drive shaft when coupled to the ICE, even when not in operation;
d. be used as an alternator to produce stabilized electric output in the range of between about 40 watts and 120 watts;
e. be used as at least one of a supporting propulsion system, or a sole propulsion system in circumstances when a low heat and/or noise signature is required; and
f. be used in a hybrid drive system to augment thrust output, range, power, operational time and their combination.

Likewise, the ICE can be configured to:

a. using the transmission band, drive (rotate) the propeller at an optimal ratio for cruising at an altitude of between about 5,000 feet and 10,000 feet (e.g., 8,000 ft.)
b. using the rotating propeller, which is inherently rotatably coupled to the electric motor, power the electric motor as an alternator to recharge the RPS thus providing electricity to at least one of on-board flight systems, sensors, communications or other power consuming elements.

Figure 5:
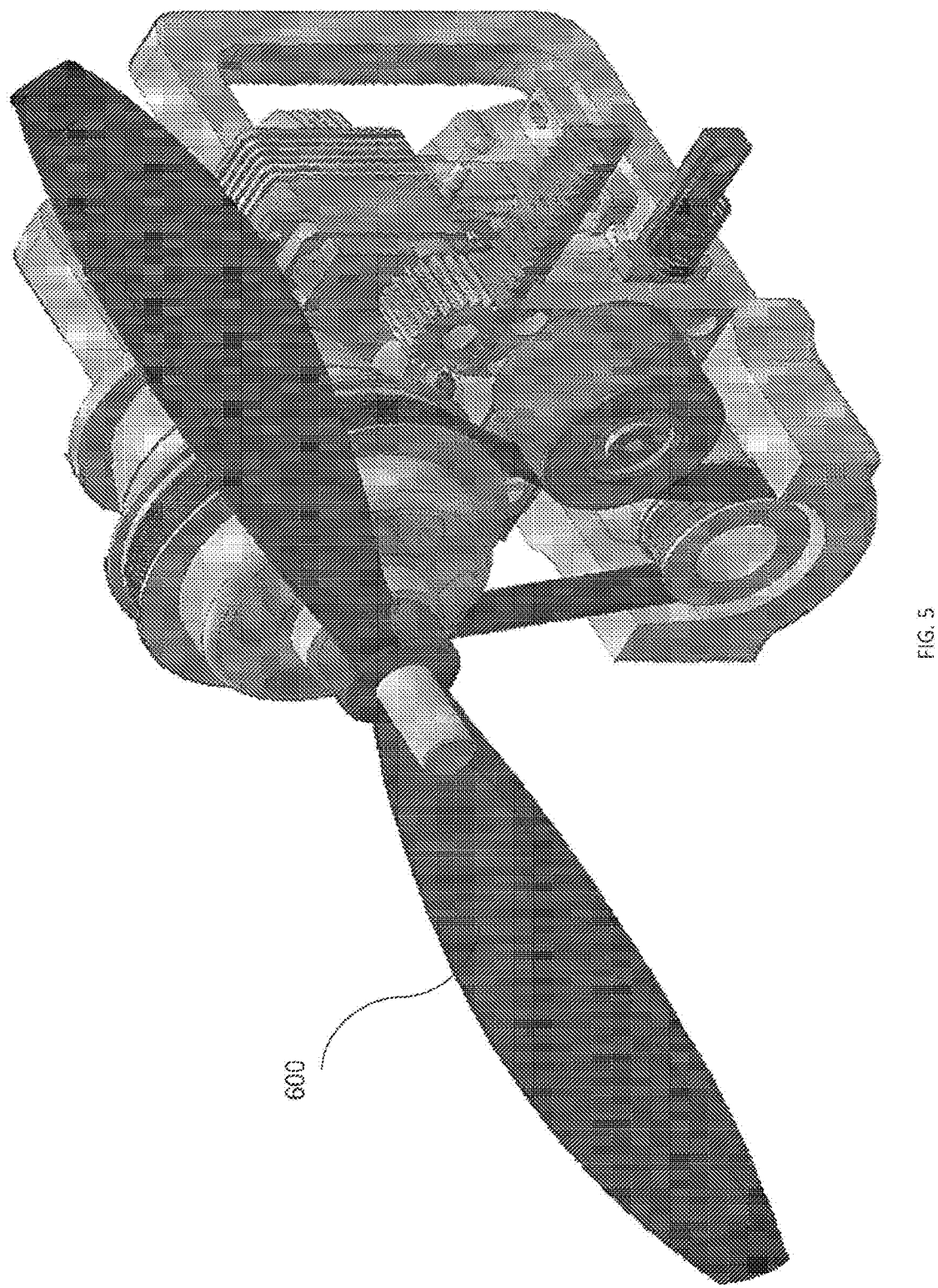
FIG. 5 illustrates a schematic showing a front top left perspective of the complete drive assembly (in a coupled state)
Figure 6:
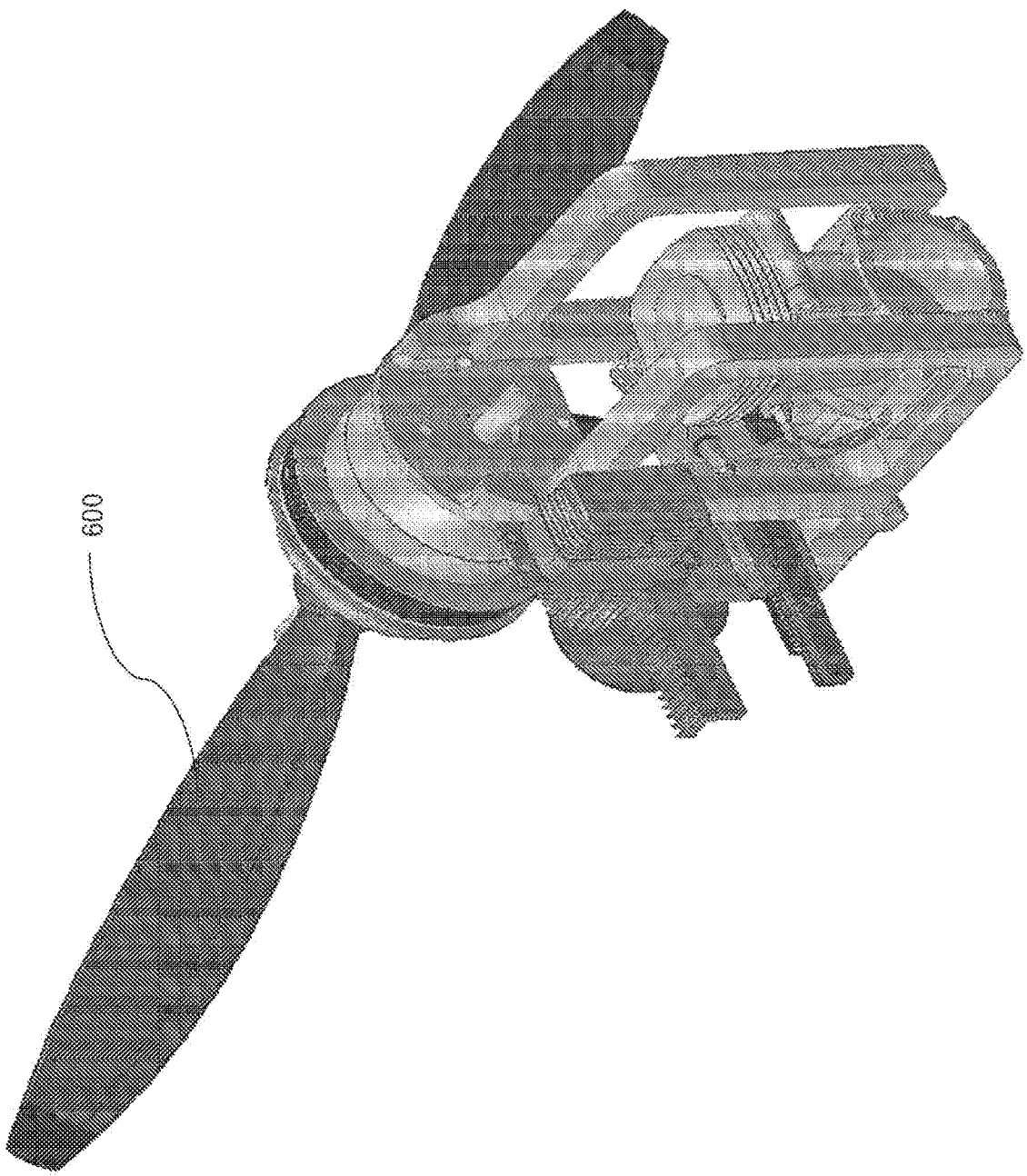
FIG. 6 illustrates a schematic showing a rear top left perspective of the complete drive assembly.

In an embodiment, the tension module used in the drive assemblies provided herein was developed using a ribbed belt configuration, the tension module can be configured to.

a. enable a transmission ratio that will correlate and coordinate between the optimal operational profile of the ICE at a predetermined cruising altitude, e.g., about 8,000 ft. above sea-level;
b. provide momentary load and vibration dampening between the ICE and the propeller (see e.g., FIGS. 5 and 6);
c. enable coupling/decoupling of the ICE and electric motor under substantial packaging constraints.

The tension module used in the drive assemblies provided herein can be configured to operate between two states; coupled and decoupled. In the decoupled state (see e.g., FIG. 2B), there is no friction (the result of the tension) or contact between the tension (ribbed) belt, the ICE pulley and the electric motor (EM) pulley, in other words, the ICE is neutralized and only the electric motor is "rotatably coupled" to the propeller. In an embodiment, the term "rotatably coupled" means that two components are attached to each other, perhaps via one or more other components, such that one or both of the two components can rotate. Additionally, or alternatively, the term "rotatably coupled" refers to a situation where one element is coupled to another element in a fixed spatial relation, but is free to rotate with respect to the other element. In other words, no substantial lateral movement of the two elements takes place, while relative rotation between the two elements is possible. In yet other words, the term "rotatably coupled" refers to a situation where the rotation of the one element does not necessarily result in a rotation of the other element and vice versa. The one element may be supported with respect to or mounted to the other element in a way that permits rotation, such as via a ball bearing.

Conversely, in the coupled state (see e.g., FIG. 2A), the tension module's pulley is urged against the tension belt, creating friction and contact between the ICE pulley and the electric motor pulley, thus coupling the two drive shafts. The term "module", when used in connection with the tension module, relates to an independent unit or a unit that is a part of a larger apparatus or assembly, in which tension is modulated. Tension modulating can comprise, for example coupling or decoupling the ICE and EM by modulating the tension of the tension belt using the tension pulley.

Affecting the coupling and decoupling is achieved in an embodiment, using a rack and pinion system whereby the tension pulley is operably coupled to the rack, configured for a smooth linear motion. Using the rack and pinion configuration allowed in another embodiment to neutralize motion moments that would have resulted from rotational motion of the tension pulley and its impact especially at the nose (or tail) section of the UAV. In addition, using the rack ensures in yet another embodiment, a longer lateral motion of the tension pulley and thus a complete decoupling of the tension belt in the decoupled configuration.

To eliminate the need to "lock" the tension pulley against the tension belt, the drive assembly is configured to continuously bias the tension pulley against the tension belt using a biaser having a biasing force configured to maintain the necessary tension of the tension belt to maintain the coupling of the ICE pulley and the electric motor pulley. This configuration significantly improves the system's operation, in terms of maximum output obtained, as well as systems' reliability and the ability of the ICE to overcome unexpected and momentary increases in torque loads on the ICE drive shaft. The latter causes the biaser to be compressed, thus "loosening" the tension of the tension belt, reducing the torque load and increasing ICE RPM, thus increasing momentary (temporary) output, allowing the ICE to overcome the unexpected torque load.

In another embodiment, and to achieve a normally-tensioned configuration, the pinion used in the drive assemblies provided herein, is a segmented spur gear, having a cross section defining a circular segment with a chord that is less than the circle's diameter and a height that is larger than the circle radius. (see e.g., FIGS. 2A and 3C). Accordingly, when in the coupled (normal) state, the flat part of the pinion abuts the rack, allowing for the biaser to urge the tension pulley against the tension belt.

The term "biaser" refers to any device that provides a biasing force. Representative biasing elements include but are not limited to springs (e.g., elastomeric or metal springs, torsion springs, coil springs, leaf springs, tension springs, compression springs, extension springs, spiral springs, volute springs, flat springs, and the like), detents (e.g., spring-loaded detent balls, cones, wedges, cylinders, and the like), pneumatic devices, hydraulic devices, magnets, and the like, and combinations thereof. Likewise, "biaser" as used herein refers to one or more members that applies an urging force between two elements, for example, between the tension pulley and the tension belt.

Figure 2A:
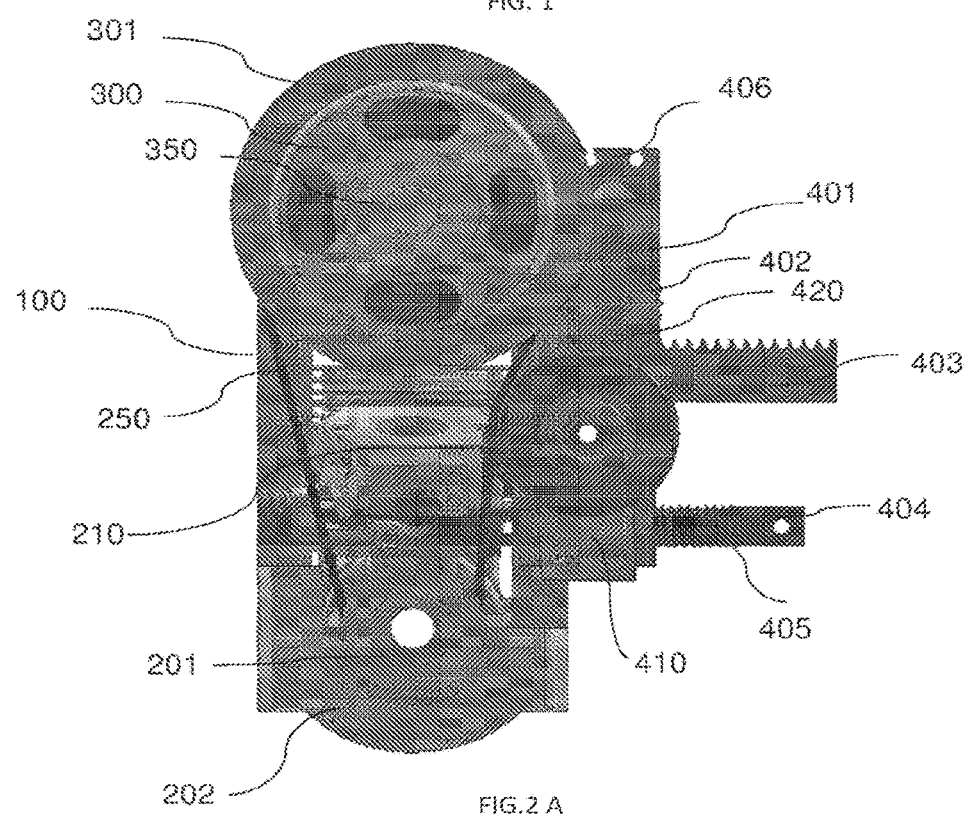
FIG. 2A illustrates a schematic showing a front elevation view of an embodiment of the drive assemblies for lightweight unmanned aerial vehicles (UAVs) where the electric motor and the internal combustion engine (ICE) are in a decoupled state, with an embodiment illustrating the electric motor and the internal combustion engine (ICE) in a coupled state illustrated in FIG. 2B.

In an embodiment, the drive assemblies provided herein further comprise a tension belt retainer (see e.g., element 202, FIG. 2A), configured to maintain contact between the tension belt and the ICE pulley (see e.g., element 201, FIG. 2A), thus ensuring there is no contact between the tension belt (see e.g., element 250, FIG. 2A) and the electric motor pulley (see e.g., element 301, FIG. 2A).

In an embodiment, the electric motor is a brushless electric motor, in other words, an alternating current motor with fixed magnets. To generate alternating current from the direct current (DC) output of the RPS, an electronic speed controller (ESC) is used. This controller is used as an inverter in yet another embodiment, converting the direct current (DC) to alternating current (AC). The ESC can be configured to generate a pulse-width-modulated (PWM) waveform with a duty cycle (of the alternating current) that is inversely proportional to the input voltage.

In an embodiment, the drive assemblies described herein further comprise a central processing module operating as a bidirectional transmission switch disposed on the three-phased power supply between the ESC and the RPS, configured to switch and direct the RPS power to two states; namely in a first state, the power is supplied solely to the electric motor, without the hybrid system coupled thereto (e.g., during UAV launch), or a second state in which the three-phased power supply generated and transmitted by the electric motor is disconnected from the ESC, and is instead connected to a rectifier that will then charge the RPS.

The following table illustrates the UAV systems' status resulting from the two switch configurations:

TABLE 1

Systems' Status as a function of Switch configuration:

| System Function | Switch Config. | EM Speed Cmd. | ICE Speed Cmd. |
|---|---|---|---|
| Launch or EM only | ESC coupled solely to EM | 100% linked to flight control module (e.g., on-board computer, automatic pilot) | NA |
| Actuating ICE | ESC coupled to EM | 40% linked to flight control module | 10% linked to flight control module |
| ICE operational, cruising and charging | current generated by EM is disconnected, rectifier engaged | NA | 100% linked to flight control module |
| Hybrid Propulsion | ESC coupled to EM | linked to flight control module | Linked to flight control module |

In another embodiment, the central processing module (CPM) can further comprise; bidirectional transmission terminals; inverter input/output to the alternator; current stabilizer input/output; current sensor among the three phases and is in communication with a memory having thereon a non-transitory processor-readable medium comprising a set of executable instructions that, when executed, cause the processor to: upon launch, actuate the electric motor until a predetermined altitude is obtained; upon receiving a command from the flight control module (which can be ground-based, remote), actuate the ICE; and upon receiving a command, engage the tension module thus effecting the urging of the tension pulley into the tension belt, engaging the ICE to drive the propeller. Furthermore, when executed, the set of executable instructions further cause the processor to channel power from the rechargeable power source to the electric motor alone; and disconnect the electric motor phases from the ESC.

In yet another embodiment, during the operation of the UAV using the drive systems disclosed and claimed herein, the user piloting the UAV may need certain data to assist in flying the aircraft. This data includes, for example air speed, altitude, weather, location, heading and other navigational data. The data can be generated by transducers or sensors which are located in various parts of the aircraft. The systems used to generate and report this and other information management data is generally termed "avionics." The term "avionics" also encompasses auto-pilot functions, which allow a computer to make inputs to the pilot's controls. In the UAV provided, using the assemblies disclosed, the avionics systems may be placed in a "pod" or housing to share, for example, power supplies, processors, memory, operating systems, utility software, hardware, built-in test equipment, and input/output ports (e.g., such as the bidirectional switch disclosed herein). This grouping of avionics is known in the art as integrated modular avionics ("IMA"). Accordingly and in an embodiment, at least one of the ESC, rectifier, or the bidirectional switch are a part of the IMA and the RPS is configured to power the IMA.

Moreover, the UAV using the drive assemblies provided are further equipped with a flight control system (FCS) configured to enable at least one of fly-by-wire (FBW) capabilities, and fly-by-light (as optical fiber and/or solid state optical data communication and control circuitry becomes more commonly used) capabilities, where control of all critical flight control parameters can be effected by computerized control systems. Pilot controlled input sensors located remotely are configured to generate electrical command control inputs to a computer control system which also receives feedback electrical inputs representing the actual current state of the aircraft (e.g., its position, attitude, speed, etc.). Based on such electrical inputs, the computerized control system generates electrical output signals that are routed to electromechanical actuators or other suitable transducers to control critical aircraft control parameters (e.g., aircraft control surfaces and systems, etc.).

In connection with the central processing module (CPM), the term 'module', as used herein, means, but is not limited to, a software or hardware component, such as a Field Programmable Gate-Array (FPGA) or Application-Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

In an embodiment, the set of executable instructions when executed further cause the processor to affect the configuration of Table 1 hereinabove, namely: during launch of the UAV, or during sole electric motor operation, electronically couple the ESC to the electric motor; during actuating the internal combustion engine, electronically couple the ESC to the electric motor and to the internal combustion engine at a predetermined control ratio; during at least one of operation of the internal combustion engine, UAV cruising or rechargeable power source charging, electronically decouple the ESC from the electric motor; and during combined operation of the electric motor and the internal combustion engine, electronically couple the ESC to the electric motor. Furthermore, during actuating the internal combustion engine by the electric motor, the predetermined ESC control ratio is preferably about 4:1 electric motor control to internal combustion engine control. Likewise, during launch of the UAV, or during sole electric motor operation, the electronic motor is further configured to solely receive operation commands from a flight control module, or an automatic pilot module or the like. In addition, during at least one of operation of the internal combustion engine, UAV cruising, or rechargeable power source charging, solely the internal combustion engine is further configured to receive operation commands from a flight control module; and during combined operation of the electric motor and the internal combustion engine, both the internal combustion engine and the electric motor are further configured to receive operation commands from a flight control module.

In another embodiment, the set of executable instructions when executed further cause the processor to at least one of: terminate actuating of the internal combustion engine by the electric motor when the intra-phase current has dropped below a predetermined level; or terminate actuating of the internal combustion engine by the electric motor when the intra-phase current has NOT dropped below a predetermined level after a predetermined period. For example, using the measurement of incoming DC current measurement to the ESC from the EM, either a decrease of about 40%, and/or upon receiving indication from the avionics that the propeller RPM is about 3,000 RPM and is stable, would indicate the ICE is operational and the ignition attempts using the EM can terminate. Conversely, after a predetermined period, for example, 10 seconds and regardless of the DC current reading (measurement), power to the ESC will be cut and the propeller RPM will be measured. If the measured RPM is either less than the predetermined value (e.g., 3,000 RPM) or the reading is unstable, the control system will measure the altitude and if the UAV is still within its mission-defined predetermined flight envelope parameters' threshold, the EM will attempt again to ignite the ICE, otherwise, the system will divert power solely to the EM to bring the UAV within the mission-defined, predetermined flight envelope's parameters.

A more complete understanding of the components, processes, and devices disclosed herein can be obtained by reference to the accompanying drawings. These figures (also referred to herein as "FIG.") are merely schematic representations based on convenience and the ease of demonstrating the presently disclosed devices, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1 illustrates an embodiment of the drive assemblies disclosed herein. As illustrated, drive assembly 10, for an unmanned aerial vehicle UAV/UAS comprises housing frame 100, an internal combustion engine 200 having ICE pulley 201 rotatably coupled to ICE 200 and tension belt 250 and retainer 202, ICE 200 being basally coupled to housing frame 100; electric motor 300 further comprising electric motor (EM) 300 pulley 301 and EM drive shaft 350, operably coupled to propeller 600 (see e.g., FIGS. 5, 6). EM 300 may be apically coupled to housing frame 100. The drive assembly further comprises the propeller 600 (see e.g., FIGS. 5, 6), rotatably coupled to EM 300. Further, tension belt 250, operably coupled to EM 300 and ICE 200 via EM pulley 301 and ICE pulley 201. Tension module (see e.g., FIGS. 3A, 3B) is also coupled to housing frame 100 and is configured to couple and decouple EM 300 and ICE 200 by continuously and selectably modulating tension belt 250 tension.

In an embodiment, the term "modulating" refers to the application of the tension pulley at a desired urging force, in order to accomplish a desired result, such as gradual synchronization of a rotational speed of rotating members such as EM 300 pulley 301 and ICE pulley 201 by tension belt 250.

Figure 3B:
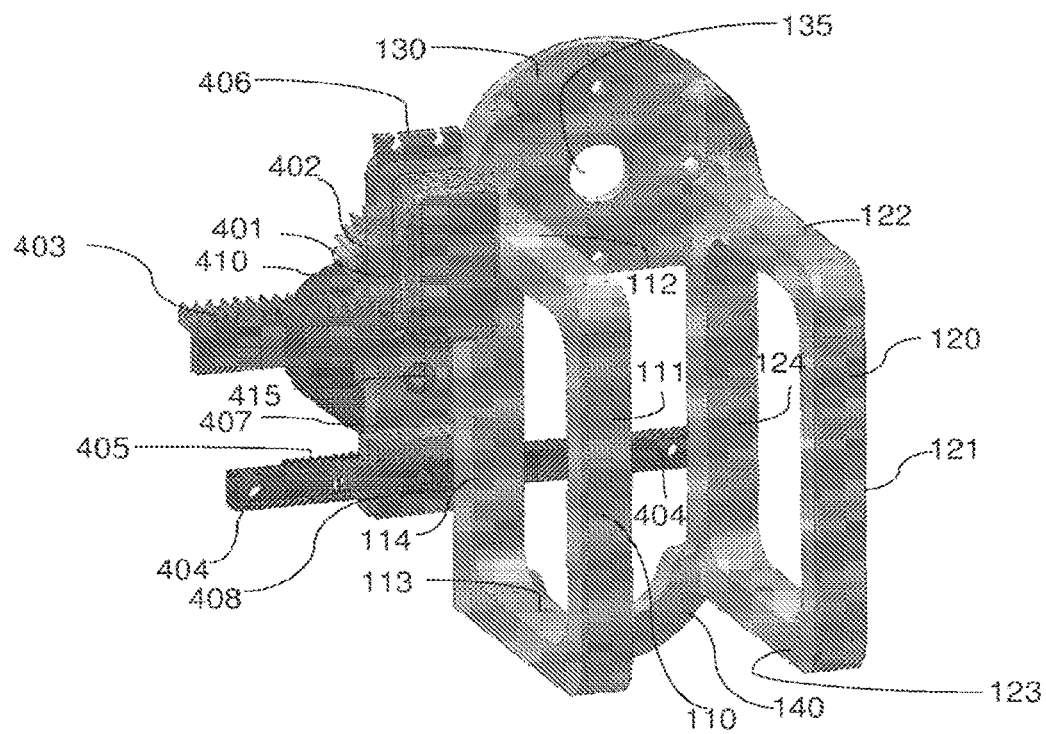
FIG. 3A illustrates a schematic showing a front top left perspective of the tension module (in a decoupled state), with rear top left perspective illustrated in FIG. 3B, and the pinion cross section illustrated in FIG. 3C.
Figure 4:
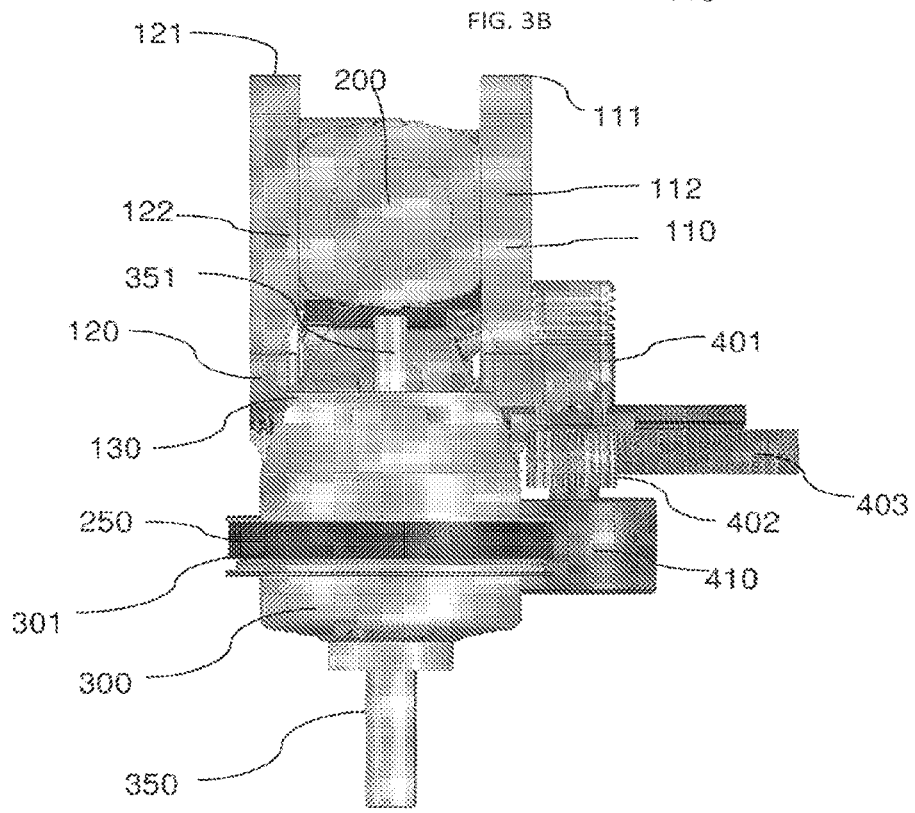
FIG. 4, illustrates a schematic showing a top plan view of an embodiment of the drive assemblies for lightweight unmanned aerial vehicles (UAVs), where the electric motor and the internal combustion engine (ICE) are in a coupled state.

Turning to FIGS. 3A-3B, illustrating housing frame 100 as comprising left bracket 110 having front beam 114, basal beam 113, rear beam 111, and apical beam 112, and right bracket 120 having front beam 124, basal beam 123, rear beam 121, and apical beam 122. Also shown is apical mounting brace 130 configured to engage EM 300, defining aperture 135 adapted to accommodate the posterior end 351 (see e.g., FIG. 4) of EM drive shaft 350. Also shown, is basal mounting brace 140, adapted to engage ICE 200, and provide an engagement platform for tension belt retainer 202.

As further illustrated in FIGS. 3A and 3B, the tension module used in the drive assemblies disclosed herein may comprise: drive unit 401 mounted in housing frame 100, for example on left side frame 100 front beam 114. Tension module 400 further comprises pinion 402 rotatably operably coupled to drive unit 401, pinion 402 configured to selectably engage toothed rack 403, operably coupled to pinion 402. As illustrated (see e.g., FIG. 3B), sled 407 is basally coupled to toothed rack 407, sled 407, defining a basal channel 408 configured to slidably engage guiding rail 404, spanning housing frame 100 between right front beam 124 and front left beam 114 and extending beyond left front beam 114 of left bracket 110. Furthermore, tension pulley 410 is rotatably coupled to sled 407 via axle 415. Further, tension module 400 comprises biaser 405, operably coupled to guide rail 404 on an end (here, the left bracket side) of guide rail 404, biaser (here a compression spring) 405, configured to bias tension pulley 410 toward tension belt 250.

As illustrated in FIGS. 3A-3C, (toothed) rack 43 and pinion 402 are configured to effect an interrupted reciprocal linear motion. This is achieved for example, using a segmented spur gear as pinion 402. As illustrated in FIG. 3C, the segmented spur gear defines a circular segment with chord $C_l$ that is less than the circle's diameter D and height h that is larger than the circle radius (h>D/2). In an embodiment, and as illustrated in FIG. 2A, sustained tension is maintained when plane 420 defined by chord $C_l$ abuts (toothed) rack 403, thus allowing biaser 405 to urge tension pulley 410 against tension belt 250, thus coupling ICE pulley 201 and EM pulley 301. Also illustrated in FIG. 2A, is carburetor 210 of ICE 200. Conversely and as illustrated in FIG. 2B, upon receiving a command to drive unit 401 through contact terminal 406, drive unit 401 (e.g., a servo motor) rotates pinion 402, engaging (toothed) rack 403, causing sled 407 rotatably coupled to tension pulley 410 via axle 415 to move laterally from tension belt 250 against biaser 405 thus loosening the contact between tension belt 250 and EM pulley 301. As indicated herein, ICE belt retainer 202 is configured to maintain contact in an embodiment between tension belt 250 and ICE pulley 201, thus terminating the contact between (ribbed) tension belt 250 and EM pulley 301.

All ranges disclosed herein are inclusive of the endpoints, and the endpoints are independently combinable with each other. "Combination" is inclusive of blends, mixtures, alloys, reaction products, and the like. Furthermore, the terms "first," "second," and the like, herein do not denote any order, quantity, or importance, but rather are used to denote one element from another. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the gear(s) includes one or more gears). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

In an embodiment, the term "coupled", including its various forms such as "operably coupling", "operably coupled", "coupling" or "couplable", refers to and comprises any direct or indirect, structural coupling, connection or attachment, or adaptation or capability for such a direct or indirect structural or operational coupling, connection or attachment, including integrally formed components and components which are coupled via or through another component or by the forming process. Indirect coupling may involve coupling through an intermediary member or adhesive, or abutting and otherwise resting against, whether frictionally or by separate means without any physical connection.

In another embodiment, the term "communicate" (and its derivatives e.g., a first component "communicates with" or "is in communication with" a second component) and grammatical variations thereof are used to indicate a structural, functional, mechanical, electrical, optical, or fluidic relationship, or any combination thereof, between two or more components or elements. As such, the fact that one component is said to communicate with a second component is not intended to exclude the possibility that additional components can be present between, and/or operatively associated or engaged with, the first and second components.

In addition, the term "slidably coupled" is used in its broadest sense to refer to elements that are coupled in a way that permits one element to slide or translate within, or with respect to another element.

The term "another", as used herein, is defined as at least a second or more. The terms "including" and/or "having", as used herein, are defined as comprising (i.e., open language).

The term "engage" and various forms thereof, when used with reference to the EM pulley and/or the ICE pulley, refers to one or a plurality of coupled components, at least one of which is configured for releasably engage EM pulley or the ICE pulley. Thus, this term encompasses both single part engaging elements and multi-part-assemblies.

As may also be used herein, the terms "module", "processing circuit" (for example, the CPM, and/or the bidirectional transmission switch) may be comprised in a printed circuit board, and/or "processing unit" may be a single processing device or a plurality of processing devices. Such a processing device may be a microprocessor, micro-controller, digital signal processor (DSP), microcomputer, central processing unit (CPU), field programmable gate array, programmable logic device, state machine, logic circuitry, analog circuitry, digital circuitry, and/or any device that manipulates signals (analog and/or digital) based on hard coding of the circuitry and/or operational instructions (in other words, firmware).

The processor, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, transient memory, non-transient memory, static memory, dynamic memory, flash memory, cache memory, and/or any device that stores digital information. Furthermore, the "processor" can include, but is not necessarily being limited to, an instruction execution system such as a computer/processor based system, an Application Specific Integrated Circuit (ASIC), a computing device, or a hardware and/or software system that can fetch or obtain the logic from a non-transitory storage medium or a non-transitory computer-readable storage medium and execute the instructions contained therein. The processor can also include any controller, state-machine, microprocessor, or any other analogue, digital and/or mechanical implementation thereof. In addition, the computer program (software and/or firmware), can comprise program code means for carrying out the steps of the methods described herein (for example, diverting power between the ESC, the EM and the rectifier), as well as a computer program product comprising program code means stored on a medium that can be read by a computer, or a storage medium that can be accessed via a data network, and may contain control command to affect the various operations of the drive assemblies described herein.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

I claim:

1. A parallel hybrid drive assembly for an unmanned aerial vehicle comprising:
   a. a housing frame;
   b. an internal combustion engine coupled to the housing frame;
   c. an electric motor coupled to the housing frame;
   d. a propeller rotatably coupled to the electric motor;
   e. a belt operably coupled to the electric motor and the internal combustion engine; and
   f. a tensioner module coupled to the housing frame, wherein the tensioner module is configured to couple and decouple the electric motor and the internal combustion engine by continuously and selectably modulating the belt tension.

2. The assembly of claim 1, wherein the housing frame comprises:
   a. a left bracket having a front beam, basal beam, rear beam and an apical beam;
   b. a right bracket having a front beam, basal beam, rear beam and an apical beam;
   c. an apical mounting brace; and
   d. a basal mounting brace.

3. The assembly of claim 1, wherein the tension module comprises:
   a. a drive unit mounted in the housing frame;
   b. a pinion rotatably operably coupled to the drive unit;
   c. a toothed rack operably coupled to the pinion;
   d. a sled operably coupled to the rack, the sled defining a basal channel configured to slidably engage a guiding rail; wherein the sled is operably coupled to the guiding rail;
   e. a tension pulley, rotatably coupled to the sled; and
   f. a biaser operably coupled to the guide rail and configured to bias the tension pulley toward the tension belt.

4. The assembly of claim 3, wherein the rack and pinion are configured to effect an interrupted reciprocal linear motion.

5. The assembly of claim 4, wherein the pinion comprises a segmented spur gear.

6. The assembly of claim 4, wherein, when in a decoupled state, the propeller is directly rotated by the electric motor.

7. The assembly of claim 5, wherein the segmented spur gear defines a circular segment with a chord that is less than the circle's diameter and the height is larger than the circle's radius.

8. The assembly of claim 7, wherein, when in a coupled state, the chord of the circular segment abuts the rack.

9. The assembly of claim 3, wherein, in the coupled state, the biaser is configured to continuously modulate the tension of the belt to maintain a predetermined range of revolutions per minute (RPM) of the propeller.

10. The drive assembly of claim 1, wherein the drive assembly further comprises:
    a. a rechargeable power source electrically coupled to the electric motor;
    b. an electronic speed controller (ESC) in electronic communication with the rechargeable power source and the electric motor;
    c. a charge controller; and
    d. a rectifier.

11. The drive assembly of claim 10, wherein 1) the rectifier is configured to rectify an electrical power signal received from the rechargeable power source; 2) the ESC is configured to control the rectified power signal from the rectifier; and 3) the charge controller is configured to control charging of the rechargeable power source using the controlled rectified power signal from the ESC.

12. The drive assembly of claim 10, wherein the electric motor is further configured to operate as an alternator to charge the rechargeable battery when in the decoupled state.

13. The drive assembly of claim 11, further comprising a central processing module (CPM) in communication containing a processor in communication with a memory having thereon a non-transitory processor-readable medium comprising a set of executable instructions that, when executed, cause the processor to:
    a. channel power from the rechargeable power source to the electric motor alone; and
    b. disconnect the electric motor phases from the ESC.

14. The drive assembly of claim 13, wherein, when executed, the set of executable instructions further cause the processor to:
    a. during launch of the UAV, or during sole electric motor operation, electronically couple the ESC to the electric motor;
    b. during actuating the internal combustion engine, electronically couple the ESC to the electric motor and to the internal combustion engine at a predetermined control ratio;
    c. during at least one of operation of the internal combustion engine, UAV cruising, or rechargeable power source charging, electronically decouple the ESC from the electric motor; and
    d. during combined operation of the electric motor and the internal combustion engine, electronically couple the ESC to the electric motor.

15. The drive assembly of claim 14, wherein during actuating the internal combustion engine by the electric motor, the predetermined ECM control ratio is about 4:1 electric motor control to internal combustion engine control.

16. The drive assembly of claim 14, wherein during launch of the UAV, or during sole electric motor operation, the electric motor is further configured to solely receive operation commands from a flight control module.

17. The drive assembly of claim 14, wherein during at least one of operation of the internal combustion engine, UAV cruising, or rechargeable power source charging, solely the internal combustion engine is further configured to receive operation commands from a flight control module.

18. The drive assembly of claim 14, wherein during combined operation of the electric motor and the internal combustion engine, both the internal combustion engine and the electric motor are further configured to receive operation commands from a flight control module.

19. The drive assembly of claim 13, wherein, when executed, the set of executable instructions further cause the processor to at least one of:
   a. terminate actuating of the internal combustion engine by the electric motor when the intra-phase current has dropped below a predetermined level; or
   b. terminate actuating of the internal combustion engine by the electric motor when the intra-phase current has not dropped below a predetermined level after a predetermined period.

20. A UAV comprising the drive assembly of claim 1.

* * * * *